(12) United States Patent
Abramov et al.

(10) Patent No.: US 10,017,411 B2
(45) Date of Patent: Jul. 10, 2018

(54) METHODS OF SEPARATING A GLASS WEB

(71) Applicants: Anatoli Anatolyevich Abramov, Painted Post, NY (US); Craig Gene Stewart, Corning, NY (US)

(72) Inventors: Anatoli Anatolyevich Abramov, Painted Post, NY (US); Craig Gene Stewart, Corning, NY (US)

(73) Assignee: Corning Incorporated, Corning, NY (US)

(*) Notice: Subject to any disclaimer, the term of this patent is extended or adjusted under 35 U.S.C. 154(b) by 554 days.

(21) Appl. No.: 14/547,688

(22) Filed: Nov. 19, 2014

(65) Prior Publication Data
US 2016/0136846 A1 May 19, 2016

(51) Int. Cl.
C03B 33/09 (2006.01)
C03B 33/02 (2006.01)

(52) U.S. Cl.
CPC ........ C03B 33/091 (2013.01); C03B 33/0215 (2013.01); C03B 33/093 (2013.01)

(58) Field of Classification Search
CPC ............................. C03B 33/091; C03B 33/093
See application file for complete search history.

(56) References Cited

U.S. PATENT DOCUMENTS

| | | | |
|---|---|---|---|
| 3,543,979 A * | 12/1970 | Hamer | C03B 33/023 219/121.67 |
| 4,562,333 A | 12/1985 | Taub et al. | |
| 5,132,505 A | 7/1992 | Zonneveld et al. | |
| 5,254,833 A | 10/1993 | Okiyama | |
| 5,984,159 A | 11/1999 | Ostendarp et al. | |
| 6,327,875 B1 | 12/2001 | Allaire et al. | |
| 6,800,831 B1 | 10/2004 | Hoetzel | |
| 6,992,026 B2 | 1/2006 | Fukuyo et al. | |
| 7,396,742 B2 | 7/2008 | Fukuyo et al. | |
| 7,547,613 B2 | 6/2009 | Fukuyo et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 8,051,679 B2 | 11/2011 | Abramov et al. | |
| 8,171,753 B2 | 5/2012 | Abramov et al. | |
| 8,327,666 B2 | 12/2012 | Harvey et al. | |
| 8,347,651 B2 | 1/2013 | Abramov et al. | |
| 8,539,795 B2 | 9/2013 | Dannoux et al. | |
| 2002/0006765 A1* | 1/2002 | Michel | B23K 26/073 451/28 |
| 2003/0024909 A1 | 2/2003 | Hoekstra et al. | |

(Continued)

OTHER PUBLICATIONS

Korean Intellectual Property Office; International Search Report and Written Opinion for International Application No. PCT/US2015/060786; dated Feb. 11, 2016; pp. 1-13.

(Continued)

Primary Examiner — Erin Snelting
(74) Attorney, Agent, or Firm — Kevin M. Able

(57) ABSTRACT

Methods of separating a glass web include the step (I) of exposing a path on the glass web to at least one laser beam to produce thermal stress along the path without damaging the glass web. The methods further include the step (II) of creating a defect on the path while the path is under thermal stress produced during step (I), whereupon the glass web spontaneously separates along the path in response to the defect.

22 Claims, 5 Drawing Sheets

(56) References Cited

U.S. PATENT DOCUMENTS

| | | |
|---|---|---|
| 2005/0221044 A1 | 10/2005 | Gaume et al. |
| 2006/0266195 A1 | 11/2006 | Hoetzel et al. |
| 2007/0039990 A1 | 2/2007 | Kemmerer et al. |
| 2007/0151962 A1 | 7/2007 | Doll et al. |
| 2008/0286548 A1 | 11/2008 | Ellison et al. |
| 2009/0046240 A1 | 2/2009 | Bolton |
| 2010/0102042 A1 | 4/2010 | Garner et al. |
| 2010/0206008 A1 | 8/2010 | Harvey et al. |
| 2011/0049765 A1 | 3/2011 | Li et al. |
| 2011/0127242 A1 | 6/2011 | Li |
| 2011/0127244 A1 | 6/2011 | Li |
| 2012/0047956 A1 | 3/2012 | Li |
| 2012/0135853 A1 | 5/2012 | Amin et al. |
| 2012/0145331 A1 | 6/2012 | Gomez et al. |
| 2013/0133367 A1 | 5/2013 | Abramov et al. |
| 2013/0280495 A1 | 10/2013 | Matsumoto |
| 2014/0138420 A1 | 5/2014 | Peng et al. |
| 2016/0009587 A1* | 1/2016 | Saito .................. B23K 26/0054 65/29.18 |

OTHER PUBLICATIONS

Abramov et al.; "Laser separation of chemically strengthened glass"; Physics Procedia 5 (2010); pp. 285-290.

* cited by examiner

METHODS OF SEPARATING A GLASS WEB

FIELD

The present disclosure relates generally to methods of separating a glass web and, more particularly, to methods of separating a glass web by creating a defect on a path under thermal stress, whereupon the glass web spontaneously separates along the path in response to the defect.

BACKGROUND

It is known to separate a glass web to achieve a glass web portion with the desired dimensions. It is further known to separate the glass web to remove low-quality edges from a high-quality central portion of the glass web.

SUMMARY

The following presents a simplified summary of the disclosure in order to provide a basic understanding of some example aspects described in the detailed description.

In accordance with one example aspect, a method of separating a glass web includes the step (I) of exposing a path on the glass web to at least one laser beam to produce thermal stress along the path without damaging the glass web. The method further includes the step (II) of creating a defect on the path while the path is under thermal stress produced during step (I), whereupon the glass web spontaneously separates along the path in response to the defect.

In one example of the aspect, step (II) is performed while step (I) is performed.

In another example of the aspect, step (II) is performed after a predetermined level of thermal stress is achieved along the path during step (I).

In still another example of the aspect, step (II) is performed when a temperature of the glass web along the path reaches a temperature in a range from about 70% to about 100% of the strain temperature point of the glass web.

In yet another example of the aspect, the glass web includes a first edge and a second edge opposed to the first edge, and wherein the path of step (I) extends between the first edge and the second edge. In one example, the defect of step (II) is applied between the first edge and the second edge.

In another example of the aspect, the laser beam travels off the glass web during step (I).

In still another example of the aspect, the glass ribbon may be non-flat and/or have a variable thickness along the path during one or both of steps (I) and (II). In such example, the depth of focus of the laser beam may be selected so as to exceed the variations in thickness and/or flatness such that glass ribbon along the path is entirely within the depth of focus.

In some example, the glass web may be at a temperature above room temperature but below the strain temperature point during one or both of steps (I) and (II).

In a further example of the aspect, step (I) includes intersecting the at least one laser beam at a corresponding beam spot on a major surface of the glass web, and wherein step (I) includes repeatedly passing the beam spot along the path to produce the thermal stress along the path. In one example, the step of repeatedly passing the beam spot includes repeatedly passing the beam spot in a single direction. In a particular example, the single direction comprises a direction extending from a first edge toward a second edge of the glass web and the defect is created closer to the first edge than the second edge. In another example, the at least one laser beam applies a varying power density along the path to produce the thermal stress.

In still a further example of the aspect, the defect is created a distance from at least one edge of the glass web, wherein the distance is from about 1 mm to about 25 mm.

In yet a further example of the aspect, the at least one laser beam of step (I) comprises a plurality of laser beams that each produce thermal stress along a corresponding segment of the path. In one example, each segment of the path overlaps at least one adjacent segment of the path.

In another example of the aspect, the defect of step (II) is created by mechanically engaging the glass web.

In still another example of the aspect, the defect of step (II) is created with a laser.

In yet another example of the aspect, the glass web comprises a glass sheet and the path extends along a length of the glass sheet. Step (II) of the method separates an edge portion of the glass sheet from a central portion of the glass sheet.

In a further example of the aspect, the glass web comprises a glass ribbon and the path extends along a width of the glass ribbon between a first edge and a second edge of the glass ribbon. Step (II) of the method separates a glass sheet from the glass ribbon.

In still a further example of the aspect, during step (I), the glass web is positioned such that the entire path is located within a depth of focus of the laser beam. In one particular example, the depth of focus of the laser beam is from about 20 mm to about 400 mm. In another particular example, the depth of focus of the laser beam is from about 20 mm to about 200 mm.

The aspect can be provided alone or in combination with one or any combination of the examples of the aspect discussed above.

In still another aspect, the glass web may comprise a plurality of layers and a coefficient of thermal expansion of one layer of the plurality of layers is different than a coefficient of thermal expansion of another layer of the plurality of layers. For example, one layer may have a composition different than another layer. The glass web, for example, may be a laminated glass web, wherein a first layer is deposited on a second layer, and in some embodiments the laminated glass web may include additional layers.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
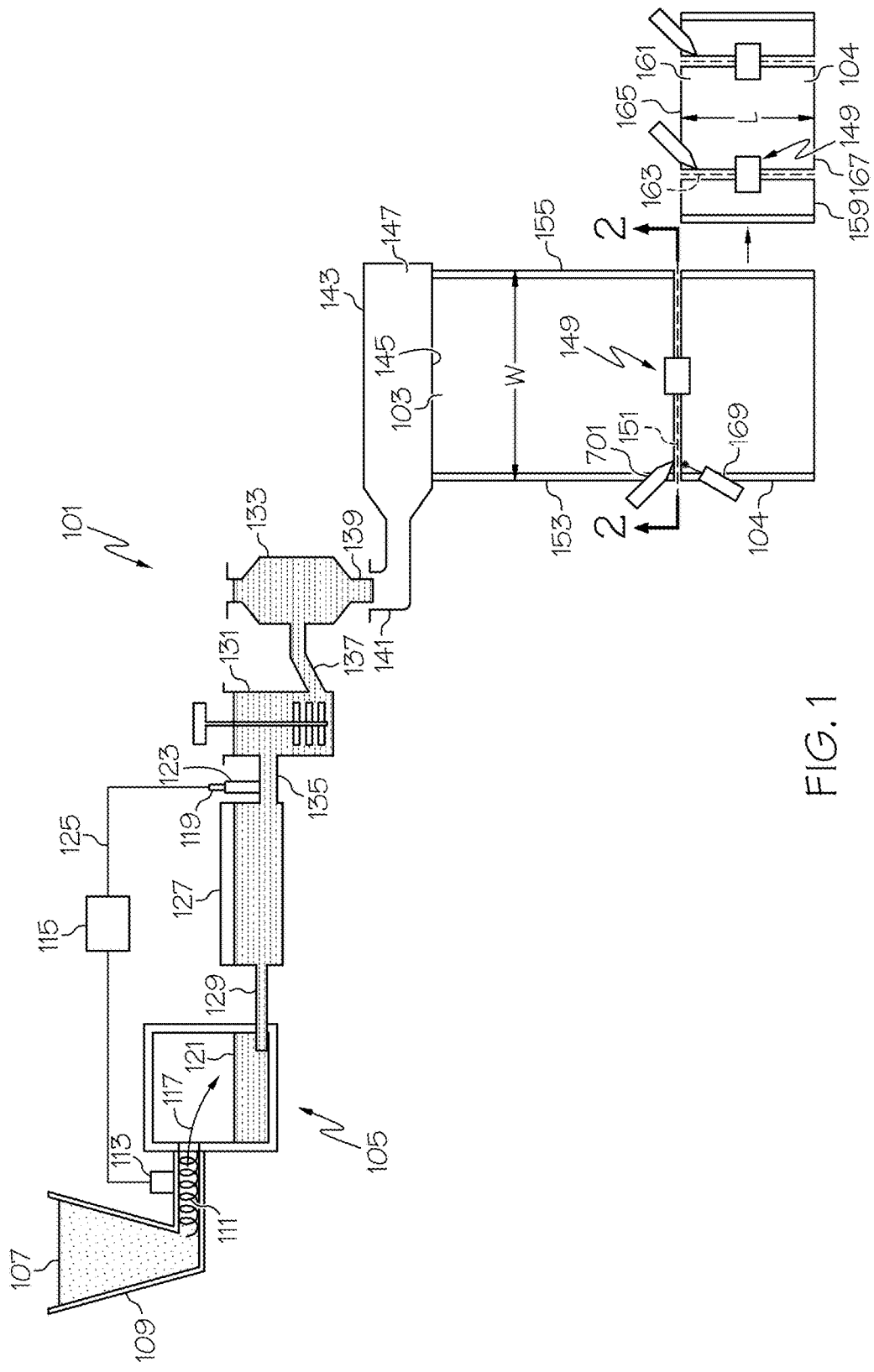
FIG. 1 is a schematic view of a fusion down-draw apparatus configured to draw a glass ribbon and example glass web separating apparatus.

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

In some examples, methods of separating a glass web may be used in conjunction with a glass manufacturing apparatus configured to fabricate a glass ribbon although other glass processing apparatus may be provided in further embodiments. In some embodiments, the glass manufacturing apparatus can comprise a slot draw apparatus, float bath apparatus, down-draw apparatus, up-draw apparatus, press-rolling apparatus or other glass ribbon manufacturing apparatus. By way of example, FIG. 1 schematically illustrates an apparatus for processing a quantity of glass melt comprising a fusion down-draw apparatus 101 for fusion drawing a glass ribbon 103 for subsequent processing into glass sheets 104. The fusion draw apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A glass melt probe 119 can be used to measure a glass melt 121 level within a standpipe 123 and communicate the measured information to the controller 115 by way of a communication line 125.

The fusion draw apparatus 101 can also include a first conditioning station such as a fining vessel 127, located downstream from the melting vessel 105 and coupled to the melting vessel 105 by way of a first connecting conduit 129. In some examples, glass melt may be gravity fed from the melting vessel 105 to the fining vessel 127 by way of the first connecting conduit 129. For instance, gravity may act to drive the glass melt to pass through an interior pathway of the first connecting conduit 129 from the melting vessel 105 to the fining vessel 127. Within the fining vessel 127, bubbles may be removed from the glass melt by various techniques.

The fusion draw apparatus can further include a second conditioning station such as a glass melt stirring chamber 131 that may be located downstream from the fining vessel 127. The glass melt stirring chamber 131 can be used to provide a homogenous glass melt composition, thereby reducing or eliminating cords of inhomogeneity that may otherwise exist within the fined glass melt exiting the fining vessel. As shown, the fining vessel 127 may be coupled to the glass melt stirring chamber 131 by way of a second connecting conduit 135. In some examples, glass melt may be gravity fed from the fining vessel 127 to the glass melt stirring chamber 131 by way of the second connecting conduit 135. For instance, gravity may act to drive the glass melt to pass through an interior pathway of the second connecting conduit 135 from the fining vessel 127 to the glass melt stirring chamber 131.

The fusion draw apparatus can further include another conditioning station such as a delivery vessel 133 that may be located downstream from the glass melt stirring chamber 131. The delivery vessel 133 may condition the glass to be fed into a forming device. For instance, the delivery vessel 133 can act as an accumulator and/or flow controller to adjust and provide a consistent flow of glass melt to the forming vessel. As shown, the glass melt stirring chamber 131 may be coupled to the delivery vessel 133 by way of a third connecting conduit 137. In some examples, glass melt may be gravity fed from the glass melt stirring chamber 131 to the delivery vessel 133 by way of the third connecting conduit 137. For instance, gravity may act to drive the glass melt to pass through an interior pathway of the third connecting conduit 137 from the glass melt stirring chamber 131 to the delivery vessel 133.

As further illustrated, a downcomer 139 can be positioned to deliver glass melt 121 from the delivery vessel 133 to an inlet 141 of a forming vessel 143. The glass ribbon 103 may then be fusion drawn off the root 145 of a forming wedge 147 and subsequently separated into the glass sheets 104 by a glass separation apparatus 149. FIG. 1 illustrates a general schematic of the glass separation apparatus 149 wherein FIGS. 2-5, 7 and 8 schematically illustrate example features of the glass separation apparatus 149. Indeed, as illustrated, the glass separation apparatus 149 may divide the glass sheet 104 from the glass ribbon 103 along a path 151 that extends along a width "W" of the glass ribbon 103 between a first edge 153 and a second edge 155 of the glass ribbon 103.

In another example, the glass separation apparatus 149 may separate an edge portion 159 of the glass sheet 104 from a central portion 161 of the glass sheet 104 along a path 163 that extends along a length "L" between a first edge 165 and a second edge 167 of the glass sheet 104.

Figure 2:
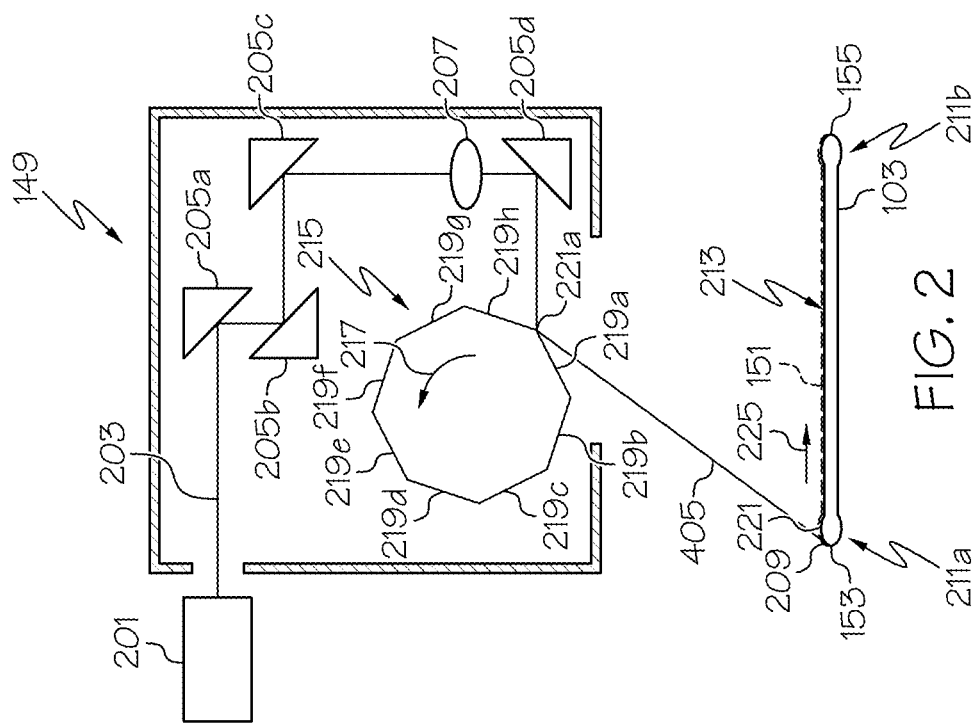
FIG. 2 is a cross sectional schematic view of an example glass separation apparatus along line 2-2 of FIG. 1, wherein a laser beam is exposing an upstream end of a path on the glass ribbon.

FIG. 2 illustrates just one example glass separation apparatus 149 schematically illustrated in FIG. 1. The glass separation apparatus can include a laser beam generator 201 configured to produce a laser beam 203. In one example, a $CO_2$ laser that can heat the selected path with relatively long pulses that may approximate a continuous flow of energy can be utilized. As such, the laser beam 203 may be designed to heat the selected path on the glass web without damaging the glass web. For purposes of this application, heating the selected path on the glass web without damaging the glass web is intended to mean heating the path without damaging the glass web in a manner that would otherwise result in separation of the glass web without application of a defect. Just some examples of heating a selected path without damaging the glass web can include heating without melting the glass web, heating without ablating the glass web, heating without creating a full-body crack in the glass web, and heating without scoring the glass web. Indeed, the laser beam 203 may avoid damaging the glass web to allow generation of a desired level of thermal stress along the path 151, 163 of the glass web (e.g., the glass ribbon 103 or the glass sheet 104) without separating the glass web prior to application of the defect as discussed below.

As further shown in FIG. 2, the example glass separation apparatus 149 may further include a series of mirrors 205a, 205b, 205c, 205d and one or more optical lenses 207 configured to provide a desired beam profile to produce a beam spot 209 on an edge portion 211a, 211b or a major surface 213 of the glass web (e.g., glass ribbon 103 or glass sheet 104). In some examples, the glass separation apparatus 149 can include a polygonal reflection device 215. The polygonal reflection device can comprise the illustrated octagonal reflection device including eight mirrors 219a-h although other polygonal configurations may be provided in further examples with different numbers of mirrors.

Figure 5:
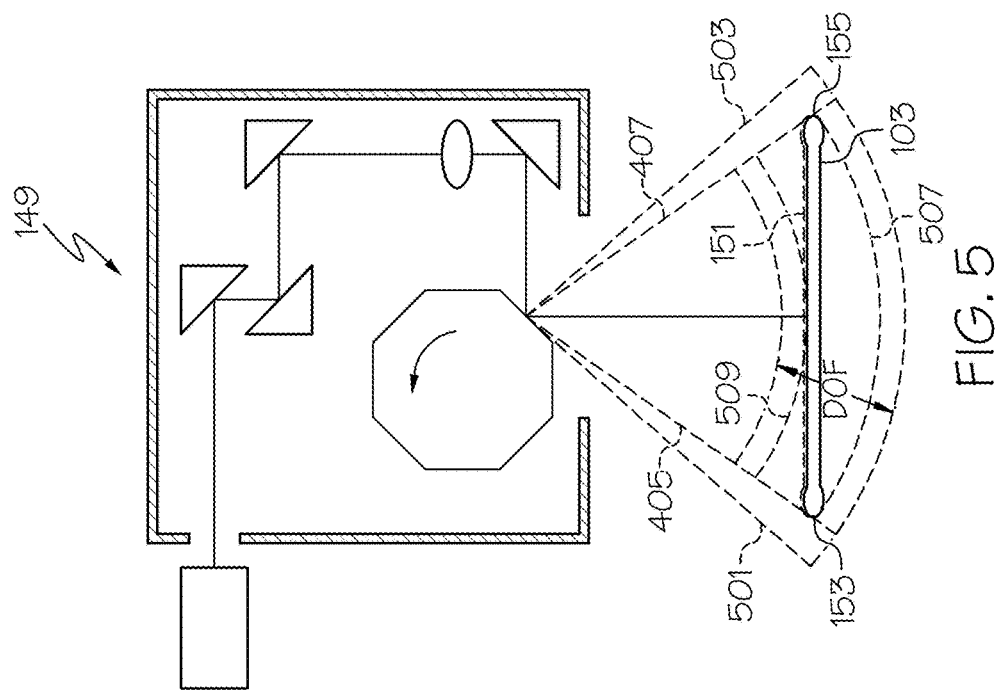
FIG. 5 illustrates the path on the glass ribbon being positioned within the depth of focus of the laser beam.
Figure 7:
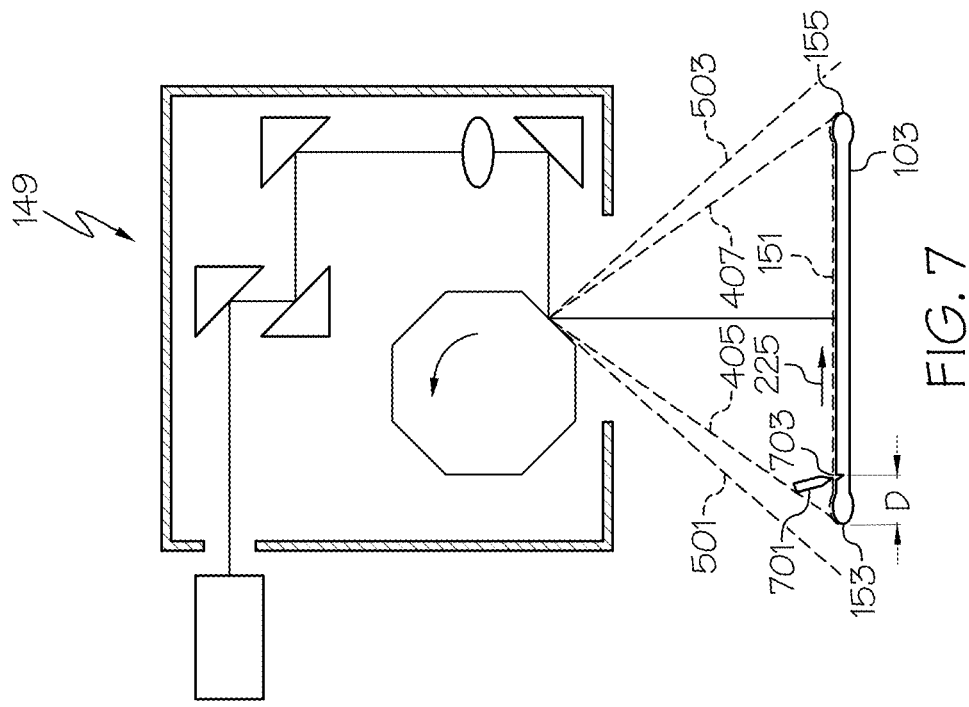
FIG. 7 illustrates the step of creating a defect in the glass ribbon on the path.

In one example, the method can include the step of exposing either one or both of the paths 151, 163 along the glass web (e.g. glass ribbon 103, glass sheet 104) by rotating the polygonal reflection device in a clockwise or counterclockwise rotation. For instance, as shown in FIGS. 2-5 and 7, the polygonal reflection device 215 may rotate in the counterclockwise direction 217 to sequentially position each of the eight mirrors 219a-h within the selected path of the laser beam. The illustrated rotation shown in the figures is shown to illustrate the principles of sweeping the laser beam. Actual configuration and/or rotation of the polygonal reflection device 215 will depend on a wide range of factors such as whether the beam sweeps between extreme positions from the first edge 153 to the second edge 155 or whether the beam sweeps off the web as shown in FIGS. 5 and 7.

As discussed below, the laser beam can heat the path on the glass web. Throughout the drawings, the path 151 is schematically shown as a broken line with the understanding that the actual path is coincident with the glass web such as the edge portions and/or major surfaces of the glass web. As shown, the path 151 can extend along the edge portions 211a, 211b and a first major surface 213 of the glass ribbon 103 facing the glass separation apparatus 149 from the first edge 153 to the second edge 155 although the path can extend along the opposite major surface of the glass ribbon or at an intermediate location between the two major surfaces of the glass ribbon. Indeed, as shown, the path 151 can extend coincident with the outer surfaces of the edge portions 211a, 211b and also extend coincident with the first major surface 213 of the glass ribbon 103. Furthermore, as shown, the first edge portion 211a can include the first edge 153 and the second edge portion 211b can include the second edge 155 wherein the path 151 can extend across a substantial portion or the entire width "W" of the glass ribbon. Likewise, referring to FIG. 1, the glass sheet 104 can include the first edge 165 and the second edge 167 wherein the path 163 can extend across a substantial portion or the entire length "L" of the glass sheet 104.

An example method of heating the path 151 will now be discussed with the example polygonal reflection device 215. As shown in FIG. 2, for example, as the first mirror 219a crosses the path of the laser beam, a first edge portion 221a of the first mirror 219a initially crosses the path of the laser beam to reflect and expose an upstream end 221 of a path 151 across the glass ribbon 103. Indeed, as shown, the upstream end 221 of the path 151 is exposed to the beam spot 209, thereby heating the path 151 at that location. As the polygonal reflection device 215 rotates in the counterclockwise direction 217, the angle of the first mirror 219a changes, such that the beam spot 209 travels along a direction 225 extending from the first edge portion 211a toward a second edge portion 211b of the glass ribbon 103.

Figure 3:
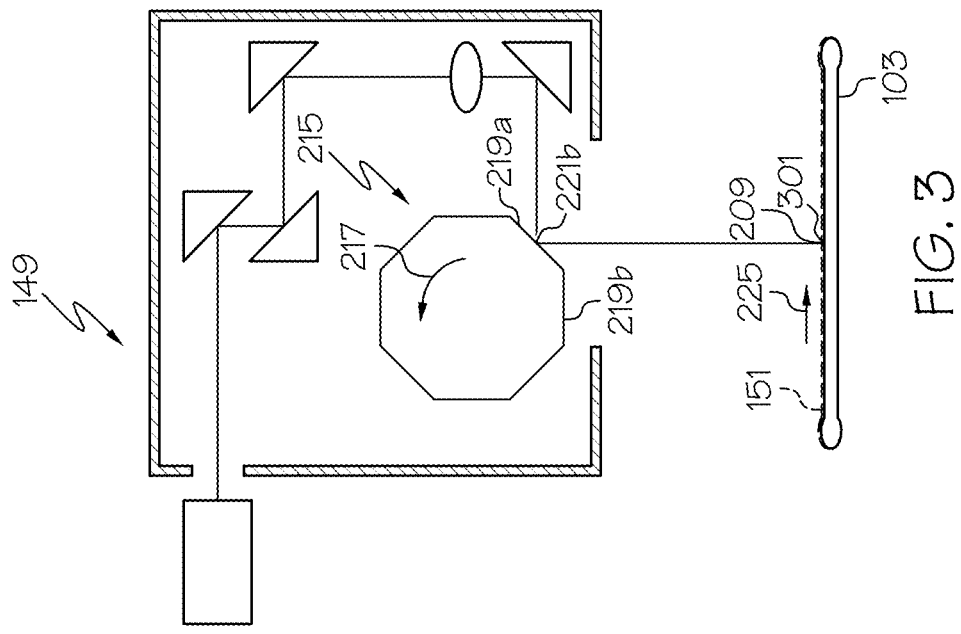
FIG. 3 illustrates the laser beam exposing an intermediate location of the path on the glass ribbon.

FIG. 3 illustrates the polygonal reflection device 215 being rotated such that an intermediate portion 221b of the first mirror 219a subsequently crosses the path of the laser beam to reflect and expose an intermediate location 301 of the path 151 to the beam spot 209, thereby heating the path at that location.

Figure 4:
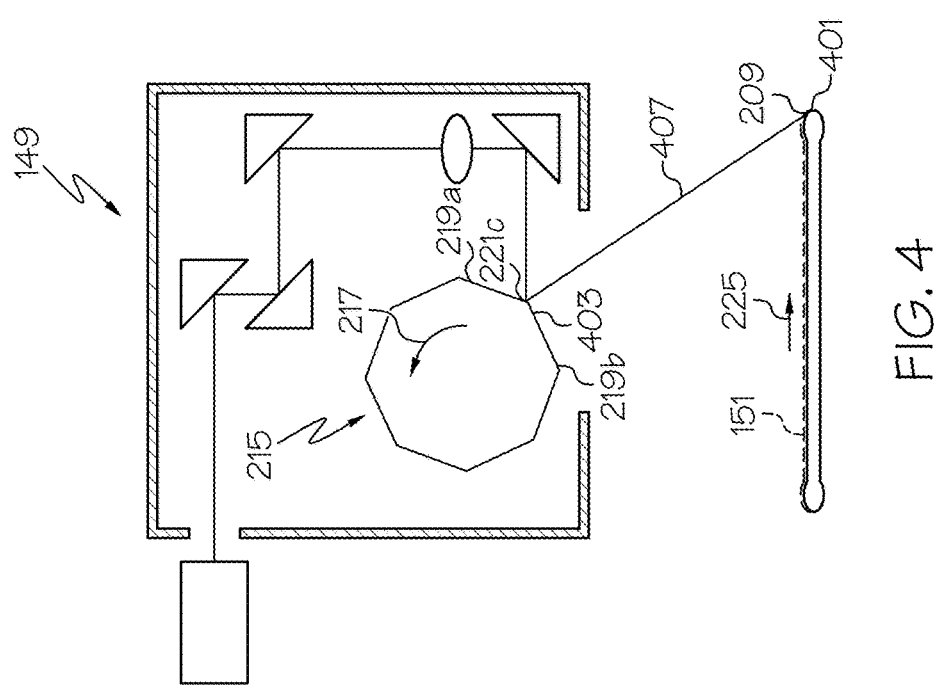
FIG. 4 illustrates the laser beam exposing a downstream end of the path on the glass ribbon.

As further shown in FIG. 4 the polygonal reflection device 215 can be even further rotated in the counterclockwise direction 217 such that a second edge portion 221c of the first mirror 219a subsequently crosses the path of the laser beam to reflect and expose a downstream end 401 of the path 151 to the beam spot 209, thereby heating the path at that location. A further incremental rotation in the clockwise direction 217 shown in FIG. 4, will cause a first edge portion 403 of the second mirror 219b to cross the path of the laser beam, wherein the laser beam spot will disappear from the downstream end 401 of the path 151 and reappear at the upstream end 221 of the path 151 as shown in FIG. 2. Of course, as the actual laser beam is a spot with a diameter and not a single point, there is a short moment in time where the spot will simultaneously reflect from adjacent portions of the adjacent mirrors. At such moment in time, the laser beam spot will partially appear simultaneously at the outer extremes of the sweep path. For example, referring to FIG. 4, during a short period of time, the beam will reflect simultaneously from the second edge portion 221c of the first mirror 219a and the first edge portion 403 of the second mirror 219b. At such moment in time, the laser beam spot 209 will partially appear at the location shown in FIG. 4 and partially appear at the location in FIG. 2.

As such, the step of heating can include repeatedly passing the beam spot along the path 151 to produce the thermal stress along the path 151. Moreover, in the illustrated example, the step of repeatedly passing the beam spot 209 can optionally include repeatedly passing the beam spot 209 in the single direction 225. Indeed, as each of the mirrors 219a-h crosses the path of the laser while the polygonal reflection device 215 rotates in the illustrated counterclockwise direction 217, the beam spot 209 always moves in the single direction 225 from the upstream end 221 to the downstream end 401 of the path 151. The beam spot can travel at various speeds along the single direction 225. In just some examples, the beam spot can travel from about 0.5 km/s to about 6 km/s, such as from about 1 km/s to about 5 km/s, such as from about 2 km/s to about 4 km/s such as about 3 km/s.

Although not shown, in further examples, the path 151 may be heated in a wide variety of ways. For instance, multiple beam generators 201 may be provided and/or the beam produced by the beam generator may be split into two or more beams to simultaneously reflect beams from different mirrors and/or different portions of the same mirror of the polygonal reflection device. As such, multiple beam spots may be provided that travel simultaneously along the single direction 225 or along opposite directions depending on the optical configuration. In another example, the laser beam produced by the beam generator may be extended into an elongated beam spot configured to simultaneously heat the entire path 151. In such examples, the beam spot may remain stationary while simultaneously heating the entire path 151.

Figure 8:
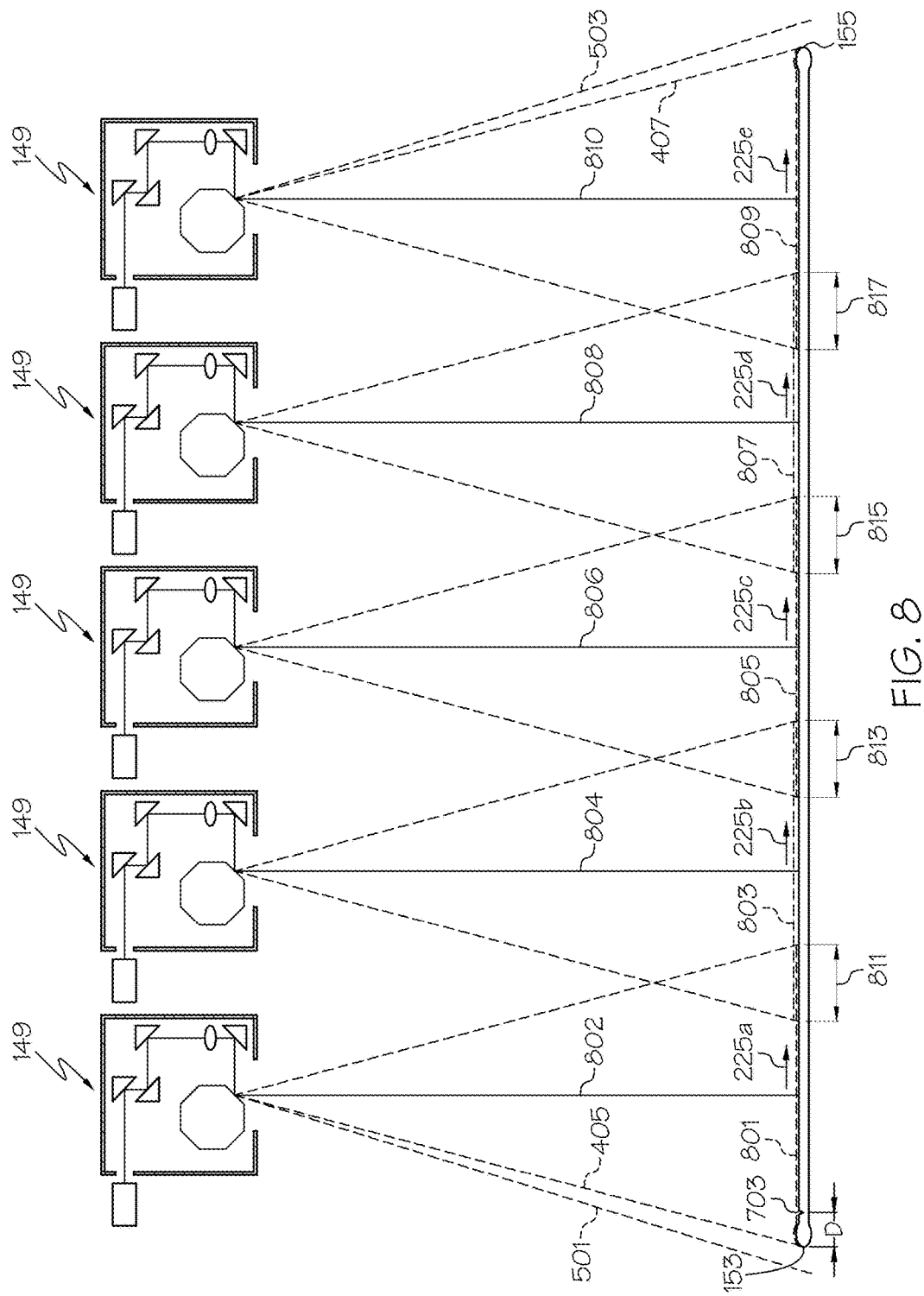
FIG. 8 illustrates another example method wherein the path is exposed to a plurality of laser beams that each produces thermal stress along a corresponding segment of the path.

In still another example, a plurality of the glass separation apparatus 149 may be provided that each produces a segment of the overall path. For instance, as shown in FIG. 8, a plurality of glass separation apparatus 149 may be provided that may optionally be similar or identical to the previously-described glass separation apparatus 149. Each glass separation apparatus 149 may produce a laser beam 802, 804, 806, 808, 810 that can produce thermal stress along a corresponding segment 801, 803, 805, 807, 809 of the overall path. In some examples, the segments may be positioned end-to-end. However, as shown, in order to provide sufficient heating between the segments, each segment of the path may overlap at least one adjacent segment of the path at overlapping regions 811, 813, 815, 817. In some examples, the overlapping regions may include an overlapped length that is from about 5% to about 40% of the length of at least one of the segments 801, 803, 805, 807,

809, such as from about 10% to about 30%, such as about 10% to about 25% of the length of at least one of the segments. In one example, each corresponding segment 801, 803, 805, 807, 809 can have a length of about 800 mm with each overlapping region 811, 813, 815, 817 having an overlapped length of about 100 mm. Providing the segments and optional overlapping regions can help achieve a sufficient level of thermal stress along the overall path extending along the glass web.

The examples of the disclosure demonstrate the laser beam spot traveling across a substantial portion such as the entire dimension of the glass web, and in some examples, the laser beam spot is also shown to travel off the glass web. As such, the path 151, 163 can likewise extend across a substantial portion such as the entire dimension of the glass web. For instance, as shown in FIG. 1, the laser beam spot passes along the entire width "W" of the glass ribbon 103 from the first edge 153 to the second edge 155 such that the path 151 extends the entire width "W" of the glass ribbon 103. Likewise, as further illustrated in FIG. 1, the laser beam spot passes along the entire length "L" of the glass sheet 104 from the first edge 165 to the second edge 167 such that the path 163 extends the entire length "L" of the glass sheet 104. In some examples, the path 151, 163 can be from about 50 mm to about 5000 mm, such as from about 50 mm to about 1000 mm although the beam spot 209 may be configured to travel along longer or shorter paths in further examples.

The laser beam spot 209 can comprise a circular spot although elliptical or other spot shapes may be provided in further examples. A minimum diameter of the circular laser beam spot 209 at the focused waist can be from about 1 mm to about 2 mm, when determined as $1/e^2$ of the intensity profile of the spot, although other dimensions may be provided in further examples. Likewise, the maximum length of an elliptical or other spot shape can be from about 1 mm to about 3 mm although other dimensions may be provided in further examples. For example, when utilizing a stationary beam the spot shape can be substantially elongated and have a length of tens of centimeters, for example in excess of 1 meter in length. One or a plurality of laser beam may be used to expose the path 151.

FIGS. 2-5, 7 and 8 demonstrate an example wherein a laser beam sweeps between a first outer position 405 and a second outer position 407 (See FIGS. 2, 5, 7 and 8). In any of the examples of the disclosure, the laser beam can travel off the web during the step of heating the path. For instance, as shown in FIGS. 5, 7 and 8, the sweep of the laser beam can optionally extend between outer positions 501, 503 that are outside the outer edges 153, 155. Permitting the laser beam to travel off the web during the step of heating can ensure that all portions of the path 151 achieve a sufficient level of thermal stress.

As further illustrated in FIG. 5, while exposing the path 151 along the glass web, the glass web may be positioned such that the entire path 151 is located within the depth of focus "DOF" of the laser beam. The depth of focus "DOF" can be calculated by the formula:

$$DOF = \left(\frac{8\lambda}{\pi}\right)\left(\frac{F}{D}\right)^2$$

where "F" is the lens focal length, "D" is the beam diameter before the lens and "λ" is the wavelength.

Positioning the entire path within the depth of focus of the laser beam can help increase efficiency of energy transfer from the laser beam to the path 151. Since the depth of focus of the laser beam exceeds amplitudes of the glass warp, thickness variation and motion of the glass web during separation, the depth of focus enables separation of non-flat glass with variable thickness, which can also move or to some extent change orientation relative to the laser beam source. In some examples, the depth of focus "DOF" can be from about 20 mm to about 400 mm, such as from about 20 mm to about 200 mm although other depths of focus may be provided in further examples.

Furthermore, in some examples, the entire web, in addition to the path of the web, may be positioned within the depth of focus. The depth of focus of the laser beam can be large enough to exceed variations of the glass thickness, glass warp or other possible changes in the position of the glass web, and consequently the path on the web, relative to the laser source during the methods of the present disclosure.

Furthermore, in some examples, a dimension of the laser beam spot 209 on a major surface of the glass web varies while repeatedly passing the beam spot along the path 151 especially near the ends of the beam path. For example, the dimension of the laser beam spot 209 on the major surface of the glass web may vary along the path 151 when the laser beam is focused along sweep path 507 or sweep path 509 although other paths may be provided while the glass web is still maintained within the depth of focus.

Figure 6:
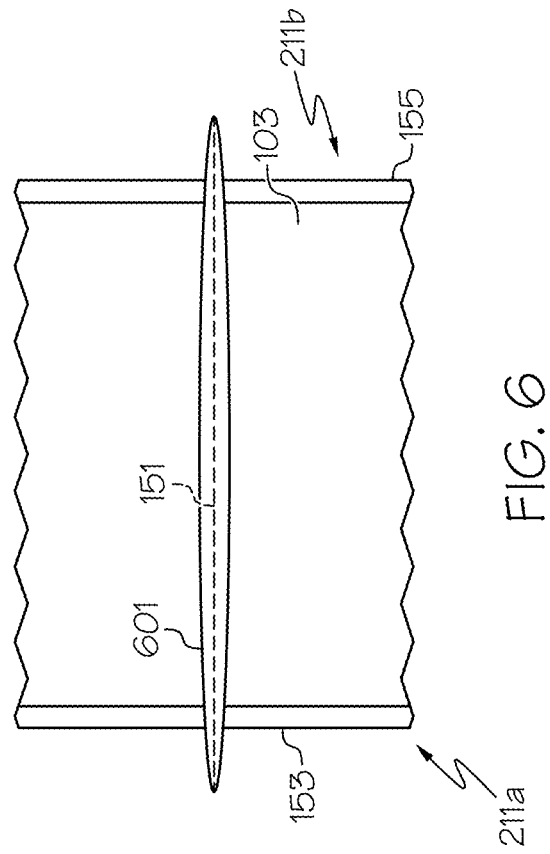
FIG. 6 is a side view of the glass web of FIG. 5 illustrating a varying power density along the path of the glass ribbon.

As shown in FIG. 6, if traveling along sweep path 509, due to the changes in the diameter and shape of the beam spot 209 along the path 151, the beam spot 209 applies a varying power density along the path 151 as represented by the illustrated truncated ellipse-like power density area 601. The ellipse-like power density area 601 on the surface of the glass web is truncated since the beam intentionally travels off the glass web in the example shown in FIG. 6. In further examples, a non-truncated elliptical power density area may be provided. For instance, the end points of the elliptical power density area in some examples may be located at the respective edges 153, 155 of the glass ribbon 103. When the edge portions 211a, 211b comprise thickened edge beads, it may be even more beneficial to separate the ribbon using two laser beams that produce maximum power densities located near or at the thickened edges (e.g., edge beads) with portions of the beam overlapping in the central area of the glass ribbon. As the maximum power densities are located closer or at the thickened edges, higher thermal stress may be targeted at the thickened portions resulting in increased thermal stress. At the same time, partially overlapping the relatively lower power density provided by the tail of the beam paths in the central area of the glass ribbon can provide enhanced thermal stress due to double exposure from the overlapping beams. Such overlapping can also be provided at overlapping regions 811, 813, 815, 817 shown in FIG. 8, wherein double exposure can account for the lower power density at the outer ends of the segments to help achieve a sufficient level of thermal stress along the overall path extending along the glass web.

Localized heating of the path 151 creates a temperature differential between different portions of the glass web that creates thermal stress along the path 151. The process of heating the path, for example as discussed above, can be carried out until a predetermined level of stress is achieved. In some examples, the preferred predetermined level of stress is the stress corresponding to the temperature along the path 151 that is from about 70% to about 100% of the strain temperature point of the glass, such as from about 80% to about 100%, such as from about 90% to about 100%, such as from about 95% to about 100% of the strain point of the glass. This level of heating avoids generation of residual stress in the glass web. In further examples, the predetermined level of stress is the stress corresponding to the temperature along the path 151 that is from the strain point up to the annealing point of the glass. While lower temperatures may be possible, sometimes it can be desired to reach relatively higher temperatures to maximize the thermal stress along the path 151. Providing a relatively high thermal stress can help reduce the separation time after applying the defect discussed more fully below. In some examples, the separation time can be from about 0.1 second to about 3 seconds after creating the defect although other separation times are possible in further examples.

The time necessary to heat the path to the desired level of thermal stress can depend on a wide range of factors such as laser power, type of glass, dimension of the glass, its thickness or other factors. In some examples, the path 151, 163 may be sufficiently heated in a range of from about 0.1 seconds to about 5 seconds with a $CO_2$ laser power of from about 300 W to about 1.5 kW and a glass thickness of from about 0.1 mm to about 3 mm.

As set forth above, the method of separating the glass web (e.g., glass ribbon, glass sheet, etc.) can include the step of exposing a path on the glass web to at least one laser beam to produce thermal stress along the path without damaging the glass web. The method can also include the step of creating a defect on the path while the path is under thermal stress produced during the step of exposing the path on the glass web to at least one laser beam, whereupon the glass web spontaneously separates along the path in response to the defect.

In one example, the defect is produced after a predetermined level of thermal stress is achieved along the path during the step of exposing the path to the at least one laser beam. Indeed, as the entire path is under a predetermined level of thermal stress, the initiation of the defect directly results in the glass web spontaneously separating along the path in response to the defect. The spontaneous separating can begin as the defect is being created or immediately after the defect is created. As such, separation of the glass web can occur as a direct result of the defect that quickly propagates a full body crack along the entire path to separate the glass web. As used herein, the term full body crack refers to a crack that extends through the entire thickness of the glass web. The time to separate the glass web in accordance with aspects of the disclosure can significantly reduce the time necessary to separate the glass web when compared to conventional techniques. As such, aspects of the disclosure can be beneficial in applications where quick separation of the glass web is desirable over conventional techniques. For instance, in applications with increased draw speed, quick separation can be beneficial to allow separation to occur within a given travel length of the glass ribbon. Furthermore, methods of the disclosure can separate the glass web even at elevated temperature conditions. For example, while separation can occur while the glass web is at room temperature, separation can also occur when the glass web is at an elevated temperature typically below the glass strain point, for example, at a temperature up to 400° C. although other maximum temperatures may be provided in further examples. As such, methods of the disclosure can provide separation before the glass ribbon is cooled during the forming process or during other processing procedures.

In one example, as shown in FIG. 7, in any of the embodiments discussed above, the step of creating the defect can be performed while performing the step of exposing the selected path to the at least one laser beam to produce thermal stress along the path. Creating the defect while exposing the path can help maintain a sufficient level of thermal stress along the path to provide quick separation that spontaneously occurs in direct response to creating the defect. In some examples, the step of exposing the selected path may be completed after beginning the step of creating the defect and may even continue until the spontaneous separation of the glass web along the path is complete. Another advantage of creating the defect while exposing the path is reduction of probability of uncontrollable breakage, which may start during exposure (heating), when the defect is created prior to exposure. This can enable reliable separation of strengthened glasses, laminated glass structures and any other glasses having high internal stress. Yet, another advantage of creating the defect while exposing the path is reduction of overall time required for separation.

In further examples, the step of exposing the selected path may be completed just prior to creating the defect, at the time the defect is being created, immediately after the defect is created, or shortly after the defect is created. In such examples, the defect can still be created when there is sufficient residual thermal stress along the path to provide spontaneous separation along the path. In some examples, however, the speed of separation can be increased by continuing to expose the path to the at least one laser beam while creating the defect and even after creating the defect (e.g., during the entire separation of the glass web). Indeed, continuing to expose the path while creating the defect can increase the speed of separation by maintaining a predetermined thermal stress, such as a maximum thermal stress along the path. However, overexposure of the beam path should be avoided to minimize or avoid generation of residual stress along the separated edges due to overheating.

The step of creating the defect may be performed in a wide variety of ways. For instance, as shown schematically in FIG. 1, in one example, the defect may be created by mechanically engaging the glass web, for example, with a scribe 701 (e.g., score wheel, diamond tip, etc.) or other mechanical device. Indeed, as shown in FIG. 7, a tip of the scribe 701 can create a defect 703 such as a surface imperfection (e.g., surface crack). In further examples, the defect may be provided as a point defect or a score line. Although not shown, a support device such as an air bearing or mechanical contact support member may be provided to help counteract the force applied by the scribe 701 to facilitate creation of the defect 703.

In another example, as shown in FIG. 1, the defect may be created with a laser 169. In one example, the laser can comprise a pulse laser configured to create a defect such as a surface imperfection although sub-surface imperfections may be provided. In some examples the defect produced by the laser 169 can comprise a crack, a point defect, a score line, or other defect wherein such defect may optionally be created by an ablation process.

In some examples, providing the defect as a score line may be beneficial to help direct a proper full body crack along the direction of the path 151, 163. For example, the score line can have a length extending along the path 151, 163 and a width that is perpendicular to the path. Example score lines can have a wide range of lengths and widths, such as a length within a range of from about 0.5 mm to about 5 mm and a width of from about 0.1 mm to about 0.3 mm. If provided as a surface defect, the depth of the defect can be from about 5 microns to about 500 microns depending on the type of glass. For example, with chemically strengthened glass, a deeper defect may be provided to reach past the chemically strengthened layer of the glass web.

The defect 703 may be provided in at any location along the path 151, 163 such as on the path. In one example, the defect is located near one of the edges 153, 155. In one example, it can be beneficial to locate the defect near the first edge 153 where scanning of the beam spot 209 starts as described below. For instance, as shown in FIG. 7, the defect 703 can be applied between the first edge 153 and the second edge 155 of the glass ribbon, or the defect may be provided at the first edge and/or the second edge in further examples. Applying the defect between the first edge and the second edge can be beneficial to help ensure that the crack begins to propagate at the location of the defect rather than at an edge imperfection that may exist at the edge of the glass web. Moreover, applying the defect between the first edge and the second edge can also result in faster separation of the glass web. In some examples, the defect can be created on an edge bead commonly found at the outer edge portions 211a, 211b of the glass ribbon 103. Alternatively, as shown in FIGS. 7 and 8, the defect may optionally be provided inboard of the edge beads. In some examples, the defect is created a distance from at least one edge of the glass web, wherein the distance is from about 1 mm to about 25 mm. For instance, as shown in FIGS. 7 and 8, in some examples, the defect 703 may be created a distance "D" from the first edge (e.g., 153, 165) of from about 1 mm to about 25 mm, such as from about 1 mm to about 10 mm although different distances may be provided in further examples.

In some examples, the defect may be created at a central portion of the path or closer to the first edge or the second edge of the glass web. In one example, as shown in FIG. 7, the defect 703 may be created closer to the first edge 153 than the second edge 155. Providing the defect 703 closer to the first edge 153 (e.g., a distance "D" from the first edge 153) can be particularly beneficial when the beam spot 209 only travels in the single direction 225 from the first edge 153 toward the second edge 155 as discussed above. In such an example, the first edge 153 is upstream along the travel path of the beam spot 209 in the single direction 225. As the full body crack tends to propagate in the single direction 225 of the beam spot 209, locating the defect closer to the first edge 153 can help propagate the full body crack quickly downstream across the width (or length) of the glass web in the direction 225. Furthermore, the defect 703 can be located the distance "D" that is close enough to also allow the full body crack to propagate upstream to intersect with the first edge 153.

Furthermore, with reference to FIG. 8, the laser beams 802, 804, 806, 808, 810 can be timed to allow the beam spot of each laser to travel along the corresponding single direction 225a, 225b, 225c, 225d, 225e in a sequential pattern such that the laser spots from adjacent lasers may coexist along the overlapping regions 811, 813, 815, 817. As such, a spot may substantially continuously travel along the single direction across the overall width of length of the glass web to help quickly drive the full body crack along the overall path.

Any of the methods discussed above may be applied to separate a glass web, such as a glass sheet or a glass ribbon. As such, examples discussed with respect to the glass ribbon 103 may also apply to the glass sheet 104 or other glass web. For instance, as illustrated with respect to FIG. 1, the path 151 can extend across the width "W" of the glass ribbon 103 between the first edge 153 and the second edge 155 of the glass ribbon 103. In such examples, creating the defect separates a glass sheet 104 from the glass ribbon 103 as shown in FIG. 1. In further examples also illustrated in FIG. 1, the path 163 can extend along the length "L" of the glass sheet 104 between the first edge 165 and the second edge 167 of the glass sheet. In such examples, creating the defect can separate the edge portion 159 of the glass sheet 104 from the central portion 161 of the glass sheet 104.

Any of the above methods can facilitate separating of a wide range of glass webs that may be flat (as shown) or may have a non-flat (e.g., warped) configuration such as bowed into a C-shape, S-shape or other configuration. Furthermore, any of the methods can facilitate separation of glass webs with a substantially uniform thickness or a non-uniform variable thickness. For instance, as shown, a glass web with relatively thick edge beads and a relatively thin central portion can be separated.

In another example, the glass ribbon may be separated when the glass ribbon is relatively stationary or when the glass ribbon is in motion. For example, the glass ribbon may be separated while in motion as it is being drawn from a forming member or if the glass ribbon is slightly swinging and/or twisting relative to the forming member. Still further, any of the methods of the disclosure can be used to separate glass web that is at an elevated temperature not exceeding approximately the strain point of the glass web.

Furthermore, methods of the disclosure can be used to separate non-strengthened glass or strengthened glass. For instance, methods can be used to separate a strengthened glass web (e.g., chemically strengthened glass web) including at least one outer layer under compression and another layer in tension. In one particular example, methods of the disclosure can be used to separate strengthened glass web that is strengthened on both sides, wherein the two major surface of the glass web are in compression and the central portion of the glass web is in tension.

In further examples, methods of the disclosure may be used to separate glass web comprising laminated glass web layers. In one example, the laminated structure can be provided with a compressive surface layer and a central layer under tension. In another example, the laminated structure can be provided with two compressive surface layers with a central layer under tension sandwiched between the two compressive layers. In still further examples, methods of the disclosure may be used to separate laminated glass web layers where at least two of a plurality of layers includes different compositions and/or different coefficients of thermal expansion. In other examples the glass web may be a chemically or thermally strengthened glass web, wherein the glass web comprises a surface compressive stress layer produced by ion exchange or thermal processing.

In further examples, the depth of focus of the laser beam may exceed amplitudes of the glass ribbon thickness variations, amplitude of warp, amplitude of glass motion relative to the beam source or other variations in processing conditions.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of separating a glass web comprising the steps of:
   (I) forming a glass web, the glass web comprising a central area, a first thickened edge portion including a first outer edge of the glass web, and a second thickened edge portion including a second outer edge of the glass web;

(II) exposing a first path on the glass web to a first laser beam to produce thermal stress along the first path between the first outer edge and the second outer edge without damaging the glass web, the first laser beam producing a maximum power density at the first thickened edge portion;

(III) exposing a second path on the glass web to a second laser beam to produce thermal stress along the second path between the first outer edge and the second outer edge without damaging the glass web, the second laser beam producing a maximum power density at the second thickened edge portion; and (IV) creating a defect on the first path while the first path is under thermal stress produced during steps (II) and (III), whereupon the glass web separates along the first and second paths in response to the defect.

2. The method of claim 1, further including overlapping the first path and the second path in the central area of the glass web.

3. The method of claim 1, wherein step (IV) is performed while steps (II) and (III) are performed.

4. The method of claim 1, wherein step (IV) is performed after a predetermined level of thermal stress is achieved along the first path and the second path during steps (II) and (III).

5. The method of claim 1, wherein the defect of step (IV) is applied between the first outer edge and the second outer edge.

6. The method of claim 1, wherein the first laser beam and the second laser beam travel off the glass web during steps (II) and (III).

7. The method of claim 1, wherein step (II) includes intersecting the first laser beam at a corresponding first beam spot on a major surface of the glass web, and repeatedly passing the first beam spot along the first path to produce the thermal stress along the first path; and step (III) includes intersecting the second laser beam at a corresponding second beam spot on the major surface of the glass web, and repeatedly passing the second beam spot along the second path to produce the thermal stress along the second path.

8. The method of claim 7, wherein the step of repeatedly passing the first beam spot includes repeatedly passing the first beam spot in a first single direction and the step of repeatedly passing the second beam spot includes repeatedly passing the second beam spot in a second single direction.

9. The method of claim 8, wherein the first single direction and the second single direction each extend from the first outer edge toward the second outer edge of the glass web, and wherein the defect is created closer to the first outer edge than the second outer edge.

10. The method of claim 1, wherein the defect is created closer to the first outer edge than the second outer edge and spaced apart from the first outer edge a distance D.

11. The method of claim 10, wherein the distance D is from about 1 mm to about 25 mm from the first outer edge.

12. The method of claim 1, wherein the defect of step (IV) is created by mechanically engaging the glass web.

13. The method of claim 1, wherein the defect of step (IV) is created with a laser.

14. The method of claim 1, wherein during step (II), the glass web is positioned such that the entire first path is located within a depth of focus of the first laser beam; and wherein during step (III), the glass web is positioned such that the entire second path is located within a depth of focus of the second laser beam.

15. The method of claim 14, wherein the depth of focus of the first laser beam is from about 20 mm to about 400 mm and the depth of focus of the second laser beam is from about 20 mm to about 400 mm.

16. A method of separating a glass web comprising the steps of:

(I) forming a glass web, the glass web comprising a central area, a first thickened edge portion including a first outer edge of the glass web, and a second thickened edge portion including a second outer edge of the glass web;

(II) intersecting a first laser beam at a corresponding first beam spot on a major surface of the glass web and repeatedly passing the first beam spot in a first single direction along a first path on the glass web to produce thermal stress along the first path between the first outer edge and the second outer edge without damaging the glass web, the first laser beam producing a maximum power density at the first thickened edge portion;

(III) intersecting a second laser at a corresponding second beam spot on the major surface of the glass web and repeatedly passing the second beam spot in a second single direction along a second path on the glass web to produce thermal stress along the second path between the first outer edge and the second outer edge without damaging the glass web, the second laser beam producing a maximum power density at the second thickened edge portion; and (IV) while performing steps (II) and (III), creating a defect on the first path at a position closer to the first outer edge than the second outer edge while the first path is under thermal stress produced during steps (II) and (III) and after a predetermined level of thermal stress is achieved along the first path and the second path during steps (II) and (III), whereupon the glass web separates along the first and second paths in response to the defect.

17. The method of claim 16, further including overlapping the first path and the second path in the central area of the glass web.

18. The method of claim 16, wherein the defect of step (IV) is applied between the first outer edge and the second outer edge, closer to the first outer edge than the second outer edge, and spaced a distance D from the first outer edge.

19. The method of claim 18, wherein the distance D is from about 1 mm to about 25 mm from the first outer edge.

20. The method of claim 16, wherein the first laser beam and the second laser beam travel off the glass web during steps (II) and (III).

21. The method of claim 16, wherein the defect of step (IV) is created by mechanically engaging the glass web.

22. The method of claim 16, wherein the defect of step (IV) is created with a laser.

* * * * *